Aug. 24, 1965

R. C. PATTON 3,202,320

APPARATUS FOR DISPENSING DRY GRANULAR MATERIAL
BY MEANS OF AN AIR CURRENT

Filed Nov. 13, 1962

INVENTOR:
ROY C. PATTON

BY

Eaton, Bell, Hunt & Seltzer

ATTORNEYS

Aug. 24, 1965

R. C. PATTON 3,202,320

APPARATUS FOR DISPENSING DRY GRANULAR MATERIAL
BY MEANS OF AN AIR CURRENT

Filed Nov. 13, 1962

INVENTOR:
ROY C. PATTON
BY
Eaton, Bell, Hunt & Seltzer
ATTORNEYS

United States Patent Office 3,202,320
Patented Aug. 24, 1965

3,202,320
APPARATUS FOR DISPENSING DRY GRANULAR MATERIAL BY MEANS OF AN AIR CURRENT
Roy C. Patton, P.O. Box 171, Jacksonville Beach, Fla.
Filed Nov. 13, 1962, Ser. No. 237,182
6 Claims. (Cl. 222—57)

The present invention relates to a dispensing apparatus and more particularly, to a dispensing apparatus for dry granular material.

Still more particularly, the apparatus of the present invention is of the type commonly used in soil treatment by dry granular material, such as chemicals for retarding the growth of undesirable vegetation either on the right-of-way of a railroad, highway or the like, or among certain crops, and such as suitable poisonous chemicals or insecticides. However, it should be understood that the apparatus of the present invention is not limited to such uses, but that the same may be utilized in dispensing any dry grannular material.

Conventional dispensing apparatuses for the aforementioned purposes usually utilize a blower or blowers for directing an air stream through a conduit or conduits which terminate in discharge openings and wherein a hopper adapted to contain the dry granular material is connected to the conduits intermediate the ends thereof for dispensing the granular material into the conduits and into the air stream passing therethrough. The dry granular material which is commonly used in such apparatuses has a tendency to collect in the conduits and the conduits frequently become clogged with the granular material and this is particularly true adjacent the discharge opening thereof which is usually of reduced diameter.

Additionally, the conduits of such conventional dispensing apparatuses usually have at least a portion thereof which is formed of flexible material. Such flexible portions of the conduits are readily susceptible to collapsing, kinking and the like which would also interrupt the flow of air through the conduit.

While some of these conventional apparatuses have manually operable means for controlling the flow of the granular material to the conduits including shutting off such flow to terminate the dispensing operation of the apparatuses, these manually operable means are not responsive to the flow of air and, therefore, these conventional apparatuses have no means for terminating the flow of the dry granular material into the conduits upon the interruption of the flow of air in the conduits such as by the conduit becoming clogged, kinked, collapsed, etc. Therefore, an operator must be in constant attendance during the operation of these conventional apparatuses to terminate the flow of dry granular material into the comduits in the event that the flow of air is interrupted for any reason. Otherwise, the flow of the granular material into the conduits will continue after the flow of air has been interrupted and the dry granular material will collect in the conduits at the the point that the same is dispensed thereinto. It can be readily appreciated that such a collection of the granular material in the conduits is highly undesirable and would lead to clogging of the conduits and considerable waste of the granular material.

Also, the aforementioned conventional apparatuses have no means adjacent the discharge end of the conduits whereby the flow of granular material into the conduit may be controlled. Therefore, if the conduits are being manually directed to a particular area and the operator wishes to terminate the flow of granular material into the conduits, he can only do so by returning to the area of the hopper and manually operating the valve between the hopper and the conduits The conduits are usually of considerable length in apparatuses of this character and it can readily be appreciated that considerable time will elapse prior to the operator's reaching the hoppers and closing the valves therein and considerable granular material will be wasted during this period.

It is therefore an object of the present invention to provide a dispensing apparatus for dry granular material utilizing a conduit through which an air stream is directed and into which the dry granular material is dispensed, which air stream conveys the granular material through and out of the conduit and wherein, upon interruption of the flow of air in the conduit for any reason, such as clogging, kinking, collapsing, or the like of the conduit, the dispensation of the dry granular material into the conduit is terminated.

A more specific object of the present invention is to provide a dispensing apparatus of the character described wherein the discharge end of the conduit, which in many instances is distantly located from the granular material supply, may be manually closed to the passage of the air stream therethrough by an operator of the apparatus to thus interrupt the flow of air through the conduit and wherein, in response to such interruption of the air flow, the dispensation of the dry granular material into the conduit is terminated.

Some of the objects of the invention having been stated, other objects will appear as the description proceeds, when taken in connection with the accompanying drawings, in which FIGURE 1 is a horizontal transverse section of the apparatus of the present invention taken substantially along line 1—1 in FIGURE 2;

Figure 1:
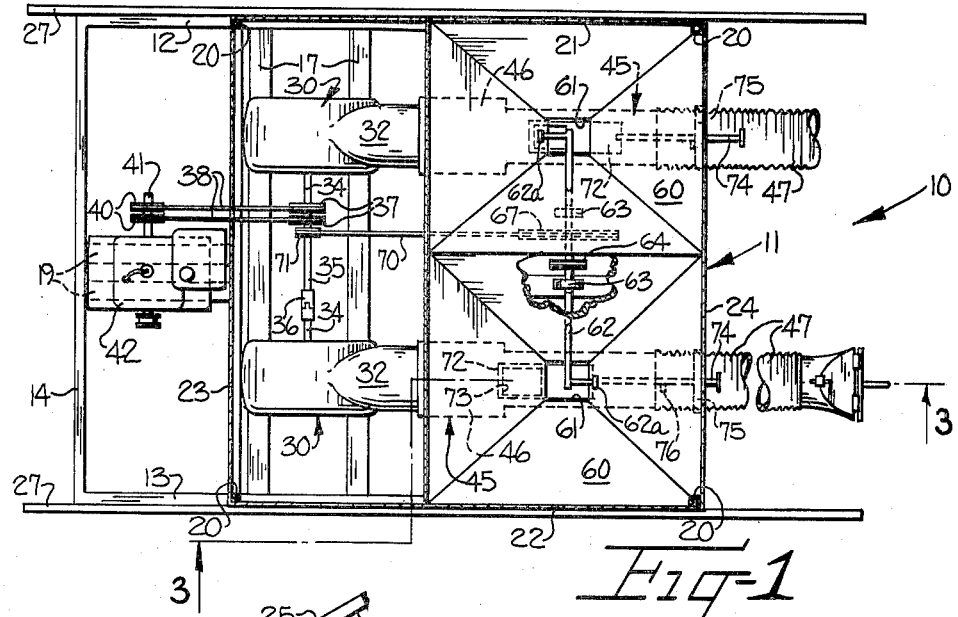
Figure 2:
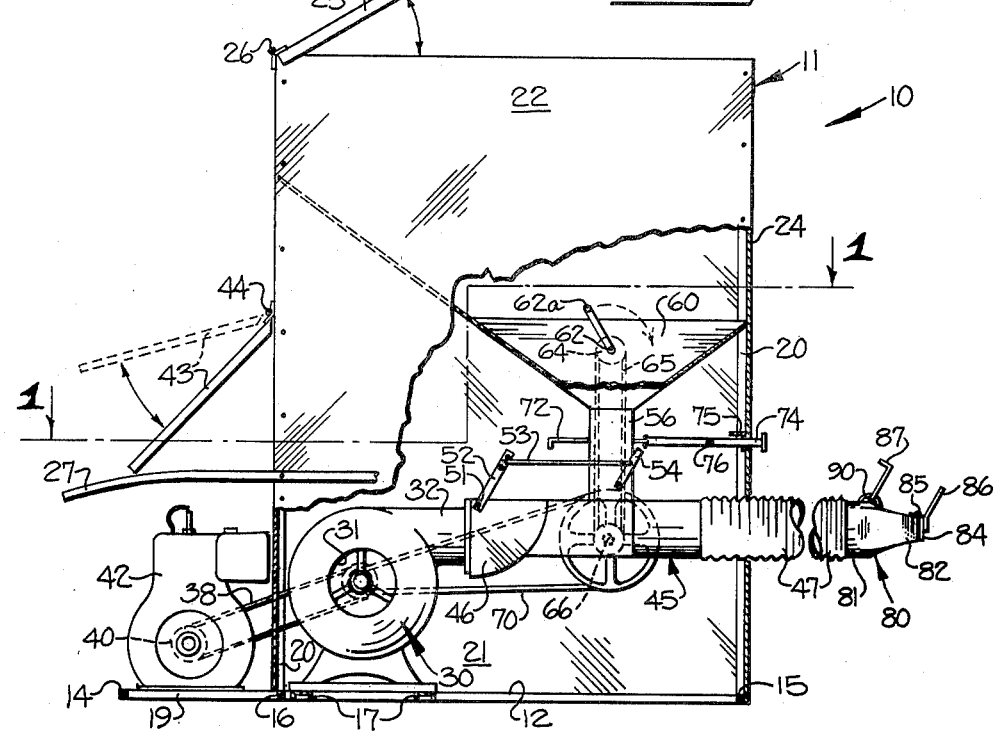
FIGURE 2 is a side elevational view of the apparatus of the present invention with portions broken away and in section for clarity in viewing the elements positioned therebehind.

Referring now to the drawings and more particularly to FIGURES 1 and 2, the apparatus of the present invention is generally indicated at 10 and comprises a housing 11. Housing 11 comprises a frame including a base portion of a pair of longitudinal side frame members 12 and 13 and end frame members 14, 15 connected at opposite ends to the side frame members 12 and 13 by any suitable means, such as welding (not shown). Also, the base portion includes an intermediate frame member 16 extending parallel to the end frame members 14, 15 and likewise secured at its ends to side frame members 12 and 13 at a point closer to end frame member 14 than to end frame member 15. The base portion further includes a pair of spaced channel members 17 extending parallel to intermediate frame member 16 and adjacent thereto between side frame members 12 and 13 and being secured to the side frame members at their opposite ends. Also, a pair of spaced channel members 19 extend between and are connected to end frame member 14 and intermediate frame member 16 medially of side frame members 12 and 13.

The frame for housing 11 also includes four upstanding posts 20 mounted at their lower ends on side frame members 12 and 13 at the four corners defined by the junction points of the side frame members and end frame member 15 and intermediate frame member 16. The frame of housing 11 is suitably enclosed by side walls 21, 22, and end walls 23, 24, which are secured to the frame members by any suitable means, preferably screws so that the side and end walls may be removed if desired. The open top of the space enclosed by the side and end walls is normally closed by a cover 25 hingedly mounted on end wall 23 by a hinge 26. An elongate member 27 (FIGURE 1) is mounted on each of the side walls 21, 22, and extends outwardly therefrom to define handles which facilitate handling of apparatus 10 and particularly, during placement thereof on and removal thereof from any suitable vehicle (not shown).

A pair of spaced apart blowers 30 are mounted on channel members 17 and are of any conventional type having an impeller (not shown) which draws air into the blower through an air inlet opening 31 therein and exhausts the same through an exhaust duct 32. It is noted that blowers 30 draw the air therein through screened openings 33 in side walls 21, 22, only one of which is shown. Blowers 30 include a shaft 34 connected to the impeller therein at one end in a manner not shown and extending outwardly therefrom toward each other. One of the blowers 30 has the shaft 34 thereof connected to a stub shaft 35 by a coupling 36 so that the coupling 36 may be disconnected to disconnect the drive to said one of the blowers 30 when only one blower is desired to be used.

Drive pulleys 37 are drivingly mounted on the shaft 34 of the other blower and on stub shaft 35 and support one end of a pair of belts 38. Belts 38 extend outwardly from pulleys 37 through a suitable opening in end wall 23 of housing 11 and are supported at their other ends by a pair of drive pulleys 40 mounted on an output shaft 41 of a suitable prime mover 42. In the embodiment illustrated in the drawings, the prime mover 42 is shown as an internal combustion engine suitably mounted on the channel members 19 of the frame for housing 11.

A hood or shield 43 is mounted on end wall 23 above prime mover 42 by a hinge 44 so that the hood may be moved from a position overlying the engine 42 to an upper position contiguous to inner wall 23 wherein the same does not overlie engine 42. Hood or shield 43 protects engine 42 from the elements and from damage due to falling objects.

Each of the exhaust ducts 32 of blowers 30 is connected to one end of a conduit 45. Conduits 45 include a first portion 46 which is preferably rectangular in cross section and a second portion 47 which is preferably in the form of a flexible sleeve. Portions 46 have the end portions thereof connected to the exhaust ducts 32 of blowers 30 enlarged and the other end portions thereof are preferably circular in cross section to facilitate connection to flexible sleeves 47.

The enlarged end portions of conduit portions 46 have the bottom wall thereof curved upwardly along an arc having a radius substantially equal to the height of this end of the conduit portions 46. This curved bottom wall portion merges with the bottom wall of the remainder of conduit portions 46 at its upper end.

A flow responsive clapper valve member 50 is pivotally mounted at said one end portion of each conduit portion 46 and is of such weight that the same maintains the conduit portion 46 closed to the passage of air therethrough until the air being directed into the exhaust duct 32 by the impeller of blowers 30 reaches a predetermined pressure or rate of flow. Each clapper valve 50 is mounted in the conduits 45 on a shaft 51 which is journaled for rotation in the side walls of the conduit portion 46 adjacent the top wall thereof. A crank arm 52 is mounted on one end of shaft 51 for rotation therewith and one end of a connecting rod 53 is connected to crank arm 52 and the other end thereof is connected to a crank arm 54.

Crank arm 54 is drivingly mounted on a shaft 55 which is journaled for rotation in two of the walls of a pipe 56 connected to the top wall of the conduit portion 46 of each conduit 45 and extending upwardly therefrom. Each pipe 56 communicates with the interior of the conduit portion 46 to which it is connected and has a valve member 57 therein mounted on shaft 55 for oscillatory movement therewith from a closed position wherein the pipe 56 is closed to an open position wherein pipe 56 is open. A baffle member 58 is mounted on the interior of each conduit portion 46 at the front wall of pipe 56 and extends downwardly and curves rearwardly therefrom to prevent the air stream directed into the conduit by the blower from entering pipe 56 when valve 57 therein is in open position.

The upper ends of pipes 56 are connected to the bottoms of a pair of side-by-side hoppers 60 mounted in housing 11 at substantially rectangular openings 61 in the bottoms thereof. Hoppers 60 are adapted to receive the dry granular material to be dispensed by apparatus 10 therein and the dry granular material is adapted to fall therefrom into the pipes 56 by gravity. Hoppers 60 are defined by four converging walls with the adjacent walls of the side-by-side hoppers being connected at their upper edges to define a partition therebetween; with the walls adjacent end wall 24 being connected thereto at their upper edges; and the walls thereof adjacent side walls 21 and 22 being likewise connected thereto. The remaining walls of side-by-side hoppers 60 merge together at the upper edge of the partition defined by the connected walls of the side-by-side hoppers and extend upwardly to end wall 23 along an acute angle to the horizontal so that the entire upper portion of housing 11 serves as the hoppers 60.

An agitator member 62 is journaled for rotation in suitable bearings 63 and has its opposite end portions disposed within the side-by-side hoppers 60. Such end portions extend into overlying relation to the openings 61 in hoppers 60 and include laterally projecting portions 62a which are adapted to agitate the material in the hoppers when agitator member 62 is rotated. To effect such rotation, a pulley 64 is drivingly mounted on agitator member 62 and supports one end of a belt 65 which extends downwardly therefrom and is supported at its other end by a pulley (not shown) supported by a shaft 66 for rotation therewith. A pulley 67 is drivingly mounted on shaft 66 and supports one end of a belt 70 which is supported at its other end by a pulley 71 mounted on stub shaft 35 for rotation therewith.

Each of the pipes 56 have opposed openings in the two remaining sides thereof in which is slidably mounted an elongate valve member 72. Valve members 72 have preferably rectangular openings 73 in one end portion thereof with the remainder being solid. The ends of the valve members 72 adjacent the openings 73 preferably terminate in down turned flanges to provide rigidity in the valve members in this area and which may also serve as a stop for the valve members when the same are moved to the open position. When moved to open position, valve members 72 have the openings 73 therein disposed in the pipes 56 to permit granular material to pass from hoppers 60 downwardly through pipes 56 into conduits 45. When in closed position, the solid portion of valve members 72 are disposed in pipes 56 and the granular material is prevented from passing through pipes 56 into the conduits 45.

A push rod 74 is connected to the other end of each of the valve members 72 and extends outwardly therefrom through a suitable opening in end wall 24 of housing 11 for facilitating manual movement of each valve member 72 between open and closed positions. A pair of guide members 75 in the form of pieces of angle material are mounted on end wall 24 at the openings therein and likewise have openings in one leg thereof through which the push rods 74 penetrate to reinforce end wall 24 in this area and to guide the push rods 74 in their movement. A stop finger 76 is mounted on each push rod 74 intermediate the ends thereof and is engageable with the angle member 75 when valve member 72 is moved to the open position to serve as a stop to properly position the valve member in such open position.

Each of the sleeve portions 47 of conduits 45 terminates in a nozzle 80 which is mounted thereon and includes a portion 81 circular in cross section which converges to a discharge portion 82 rectangular in cross section and includes a substantially rectangular discharge opening at its outer end. Discharge portions 82 each have a pair of baffle members 83 mounted therein and which are disposed at an angle to the center line of the sleeve portion 47 to deflect the air stream and granular material passing therethrough into a diffused path to broadcast the same over a greater area.

The discharge opening in discharge portion 82 of each nozzle 80 is normally closed by a valve member 84 pivotally mounted on discharge portion 82 by a pair of spring hinges 85 which bias the valve member 84 toward the closed position. Valve members 84 may be pivoted to the open position by handles 86 mounted thereon and extending upwardly and outwardly therefrom. Valve members 84 are maintained in the open position by a latch 87 mounted on each nozzle 80 by a ring 90 peneterating through an opening in the lower end of the latch member 87 and mounted on the nozzle portion 81. Therefore, latch members 87 may pivot toward and away from the dicharge openings in discharge portions 82. Each of the latch members 87 has a pair of vertically spaced openings 91, 92 therein adjacent its upper end which are adapted to receive the end portion of the corresponding handle 86 for maintaining the valve member 84 in open position. Also, the upper end portions of the latch members 87 are bent perpendicularly to the remaining portions to provide a handle for facilitating manual movement of the latch members 87 into operative association with handles 86.

In operation, hoppers 60 of the apparatus are filled with the dry granular material by moving top cover 25 to the open position and placing the granular material therein. Cover 25 is then replaced and valve members 72 are manually moved to the open position to permit the granular material to fall by gravity downwardly into pipes 56. It is noted that this granular material is prevented from falling into conduits 45 by the valve member 57 which is held in closed position by its connection to the gravity biased clapper valve member 50.

Valve members 84 are then moved to the open position and latched in such position by latches 87. The prime mover or internal combustion engine 42 is then started, which drives blowers 30 to direct a stream of air through outlet ducts 32 thereof. It is noted that if only one blower is desired to be used, coupling 35 may be disengaged and the blower 30 attached to stub shaft 35 thereby will be rendered inoperative. The other blower 30 will then be the only blower driven by prime mover 42.

Figure 3:
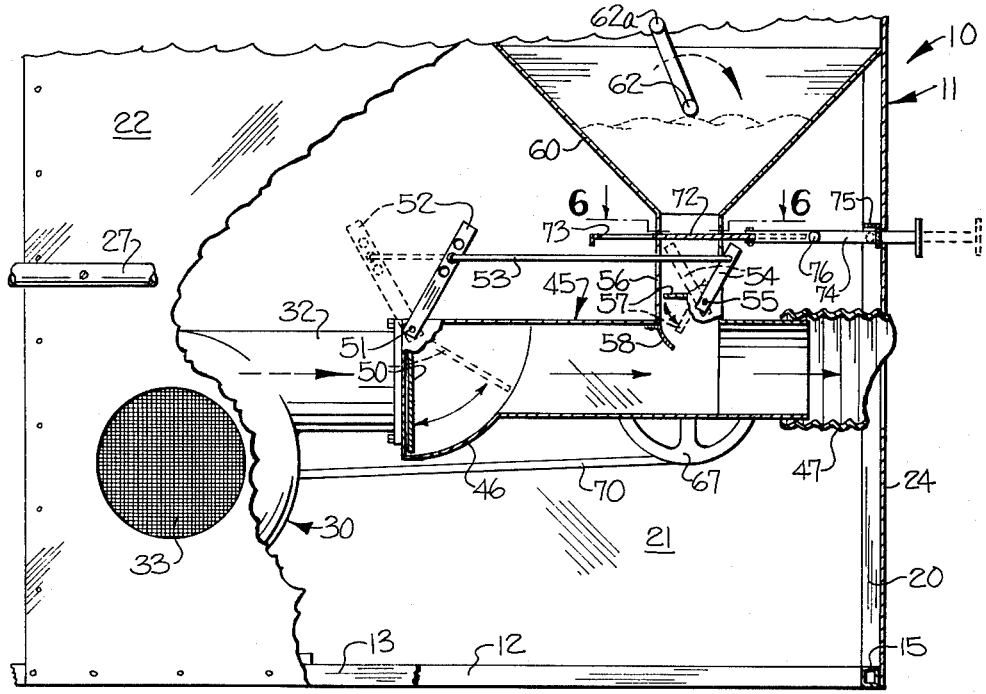
FIGURE 3 is an enlarged fragmentary section taken substantially along line 3—3 in FIGURE 1.
Figure 4:
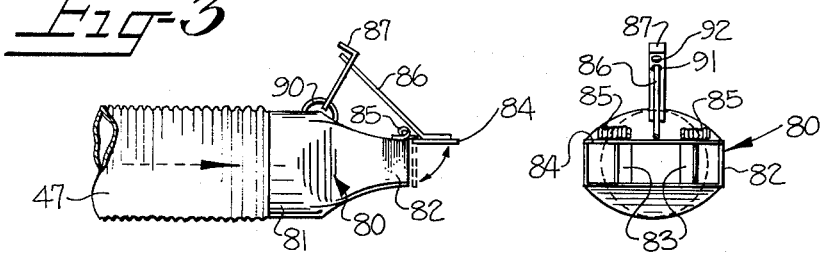
FIGURE 4 is an enlarged elevational detail of the discharge end of the conduit as shown in the right hand portion of FIGURE 2 with the valve means thereat shown in a different operational position.
Figure 5:
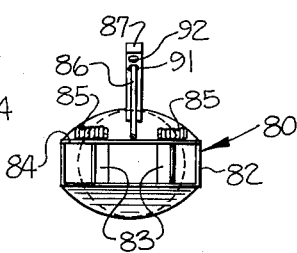
FIGURE 5 is an end elevational view of the discharge end of the conduit shown in FIGURE 4.
Figure 6:
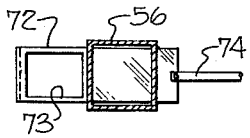
FIGURE 6 is a fragmentary section taken substantially along line 6—6 in FIGURE 3.

When the force of the air stream being directed through the outlet ducts 32 by blowers 30 reaches a predetermined pressure, the weight of clapper valve members 50 will be overcome thereby and valve members 50 will be swung upwardly about its pivot. It is noted that the curved portions of the bottom walls of conduit portions 46 cooperates with valve members 50 to prevent the air streams from entering the remainder of the conduits 45 until the valve members 50 operating through the crank arm 52, connecting rod 53 and crank 54 have moved valve members 57 in pipes 56 to the fully open position. When valve members 50 are moved upwardly in a counterclockwise direction (as seen in FIGURE 3) sufficiently for the lower end thereof to move out of engagement or contiguous relation with the curved portions of the bottom walls of the conduit portions 46, air streams pass into the remainder of conduit portions 46 and thence to sleeve portions 47 of conduits 45 and out of the nozzles 80. As the air streams move past pipes 56, the same pick up and carry along the dry granular material.

Valve members 50 will be maintained open and air streams will be directed into conduits 45 as long as the rate of flow of the air streams is sufficient to support the weight of the valve members. If, however, conduits 45 become clogged with the dry granular material or if valve members 84 are moved to the closed position, the air streams being directed into conduits 45 are prevented from exiting from nozzles 80 and back pressure is created in conduits 45, thereby decreasing or terminating flow of the air streams in conduits 45. When the rate of flow of the air streams against valve member 50 is insufficient to support the weight thereof, valve members 50 move downwardly by gravity to the closed position and simultaneously move valve members 57 in pipes 56 to the closed position thereby terminating the flow of the granular material into the conduits 45. Therefore, the flow of granular material from hoppers 60 into conduits 45 is controlled by valve members 57, which, in turn, are controlled by the rate of flow responsive valve members 50 in conduits 45.

It will therefore be apparent that a dispensing apparatus for dry granular material is provided wherein upon clogging or closing of the conduits which are directing the granular material from the apparatus, the flow of granular material into such conduits is terminated thereby providing increased control and a more efficient dispensing apparatus.

In the drawings and specification there has been set forth a preferred embodiment of the invention and, although specific terms are employed, they are used in a generic and descriptive sense only and not for purposes of limitation, the scope of the invention being defined in the claims.

I claim:

1. Apparatus for dispensing dry granular material comprising
 (a) blower means for creating an air stream and directing the air stream through an exhaust opening therein,
 (b) an elongate conduit communicatively connected at one end to the exhaust opening of said blower means and having a discharge nozzle at its other end,
 (c) a hopper adapted to contain a supply of the dry granular material and being communicatively connected to said conduit intermediate the ends thereof for dispensing the dry granular material into said conduit,
 (d) a control valve mounted between said hopper and said conduit and movable between open and closed positions for controlling the dispensation of the dry granular material into said conduit,
 (e) a vertically disposed clapper valve mounted within said conduit for pivotal movement about a pivot disposed adjacent the top of said conduit and having the portion of the valve below the conduit disposed in the path of the air stream being directed through the conduit by said blower means for sensing the flow of air through the conduit,
 (f) means connecting said clapper valve to said control valve so that said clapper valve will move said control valve to its open position in response to the flow of air through the conduit and to the closed position in response to interruption of the flow of air through the conduit, and
 (g) valve means mounted on said discharge nozzle of said elongate conduit remote from said hopper and manually operable to close said discharge nozzle to the passage of air therethrough for interrupting the flow of air through the conduit so that said clapper valve and said control valve in response thereto terminate the dispensation of dry granular material into said conduit.

2. Apparatus for dispensing dry granular material comprising
 (a) blower means for creating an air stream and directing the air stream through an exhaust opening therein, (b) an elongate conduit communicatively connected at one end to the discharge opening in said blower means and having a discharge nozzle at its other end, the portion of said elongate conduit adjacent said blower means being substantially rectangular in cross section and the portion of the conduit adjacent the discharge nozzle being formed of flexible material, (c) a hopper adapted to contain a supply of the dry granular material and being disposed above and adjacent said one end portion of said conduit and including a discharge opening in the bottom thereof, (d) pipe means communicatively connecting said hopper to said conduit, (e) control valve means mounted in said pipe means and movable between open and closed positions to control the dispensation of the granular material into said conduit, (f) a vertically disposed substantially rectangular clapper valve pivotally mounted in said rectangular portion of said conduit for movement about a pivot adjacent the top wall of said conduit and having the portion thereof below the pivot disposed in the path of the air stream being directed through said conduit by said blower means for sensing the flow of air through the conduit and being movable upwardly in response to such flow and downwardly about said pivot upon interruption of such flow, (g) means connecting said clapper valve to said control valve means so that said clapper valve moves said control valve means to the open position in response to the flow of air and to the closed position in response to interruption of such flow through said conduit, (h) a manually operable valve pivotally mounted on said discharge nozzle of said elongate conduit and normally disposed in closing relation to said nozzle to prevent the passage of air therethrough for thereby interrupting the flow of air in said conduit and being movable to an open position to permit the passage of air through said discharge nozzle, and (i) means carried by said discharge nozzle for releasably maintaining said manually operable valve in the open position.

3. The structure recited in claim 2 wherein the end portion of said rectangular portion of the conduit immediately adjacent said blower means is enlarged to provide a greater cross sectional area than the remainder of said rectangular portion, and wherein said rectangular clapper valve is of substantially the same dimensions as the end of said conduit connected to said blower, and wherein the bottom wall of said enlarged portion curves upwardly from said end connected to said blower along an arc having a radius substantially equal to the height of said clapper valve to the level of the bottom wall of the remainder of said rectangular portion so that said clapper valve must move about its pivot for an arc at least as great as the bottom wall of said enlarged portion before the air stream from said blower means may pass through said conduit to insure that said control valve is in the fully open position when the air stream is permitted to pass through said conduit.

4. Apparatus for dispensing dry granular material comprising (a) blower means for creating an air stream and directing the air stream through an exhaust opening therein, (b) an elongate conduit communicatively connected at one end to the exhaust opening of said blower means and having a discharge opening at its other end, (c) a hopper adapted to contain a supply of the dry granular material and being communicatively connected to said conduit intermediate the ends thereof for dispensing the dry granular material into said conduit, (d) control valve means disposed between said hopper and said conduit and movable between open and closed positions for controlling the dispensation of dry granular material into said conduit, and (e) sensing means mounted within said conduit adjacent said blower means and normally substantially closing said conduit to the flow of air therethrough, said sensing means being operatively connected to said control valve means and being responsive to a predetermined rate of flow of air from said blower means for opening said conduit to the flow of air therethrough and for moving said control valve means to open position and being responsive to interruption of the predetermined flow of air from said blower means for closing said conduit and for moving said control valve means to the closed position for terminating the dispensation of dry granular material into said conduit.

5. Apparatus for dispensing dry granular material comprising (a) blower means for creating an air stream and directing the air stream through an exhaust opening therein, (b) an elongate conduit communicatively connected at one end to the exhaust opening of said blower means and having a discharge opening at its other end, (c) a hopper adapted to contain a supply of the dry granular material and being communicatively connected to said conduit intermediate the ends thereof for dispensing the dry granular material into said conduit, (d) control valve means disposed between said hopper and said conduit and movable between open and closed positions for controlling the dispensation of dry granular material into said conduit, (e) sensing means mounted within said conduit adjacent said blower means and normally substantially closing said conduit to the flow of air therethrough, said sensing means being operatively connected to said control valve means and being responsive to a predetermined rate of flow of air from said blower means for opening said conduit to the flow of air therethrough and for moving said control valve means to open position and being responsive to interruption of the predetermined flow of air from said blower means for closing said conduit and for moving said control valve means to the closed position for terminating the dispensation of the dry granular material into said conduit, and (f) means operatively associated with said sensing means and cooperable therewith for assuring that said control valve means is moved to the open position before said conduit is opened to the passage of air therethrough.

6. Apparatus for dispensing dry granular material comprising (a) blower means for creating an air stream and directing the air stream through an exhaust opening therein, (b) an elongate conduit communicatively connected at one end to the exhaust opening of said blower means and having a discharge opening at its other end, (c) a hopper adapted to contain a supply of the dry granular material and being communicatively connected to said conduit intermediate the ends thereof for dispensing the dry granular material into said conduit, (d) control valve means disposed between said hopper and said conduit and movable between open and closed positions for controlling the dispensation of dry granular material into said conduit, (e) a substantially vertically disposed clapper valve mounted within said conduit adjacent said blower means for pivotal movement about a pivot point disposed adjacent the upper portion of said conduit with the portion of said clapper valve below said pivot point being disposed in the path of the air stream being directed through the exhaust opening of said blower means, said clapper valve being movable about its pivot in response to a predetermined rate of flow of air from the exhaust opening and returning to its vertical position upon interruption of such predetermined rate of air flow, and (f) means connecting said clapper valve to said valve means between said hopper and said conduit so that the valve means is opened by said clapper valve upon movement thereof in response to said predetermined rate of air flow and is closed upon the return of the clapper valve to the vertical position.

References Cited by the Examiner

UNITED STATES PATENTS

| | | | |
|---|---|---|---|
| 1,310,815 | 7/19 | Weaver | 302—42 X |
| 1,752,956 | 4/30 | Lex | 222—193 |
| 2,187,376 | 1/40 | Guibert | 222—193 |
| 2,916,441 | 12/59 | Kruse | 222—193 X |

FOREIGN PATENTS 505,040  4/51  Belgium.

LOUIS J. DEMBO, *Primary Examiner.*